(12) United States Patent
Mangan et al.

(10) Patent No.: US 7,245,807 B2
(45) Date of Patent: Jul. 17, 2007

(54) OPTICAL FIBER AND METHOD FOR MAKING AN OPTICAL FIBER

(75) Inventors: Brian Joseph Mangan, Bath (GB); Lance Farr, Hereford (GB)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 10/907,607

(22) Filed: Apr. 7, 2005

(65) Prior Publication Data

US 2005/0226578 A1    Oct. 13, 2005

(30) Foreign Application Priority Data

Apr. 8, 2004  (GB) ................. 0408082.6

(51) Int. Cl.
*G02B 6/00* (2006.01)
(52) U.S. Cl. ................ 385/125; 385/126
(58) Field of Classification Search ............ None
See application file for complete search history.

(56) References Cited

U.S. PATENT DOCUMENTS

| 5,221,308 | A | 6/1993 | Krohn et al. |
| 6,444,133 | B1 | 9/2002 | Fajardo et al. |
| 2004/0050110 | A1 | 3/2004 | Berkey et al. |
| 2004/0258381 | A1* | 12/2004 | Borrelli et al. ............ 385/125 |
| 2005/0074215 | A1* | 4/2005 | Sanghera et al. ......... 385/125 |
| 2005/0281522 | A1* | 12/2005 | Kim et al. ................ 385/125 |

FOREIGN PATENT DOCUMENTS

| GB | 2 350 904 A | 12/2000 |
| WO | 00/60388 | 10/2000 |
| WO | 03/080524 A1 | 10/2003 |

OTHER PUBLICATIONS

*T. A. Birks et al., "Endlessly Single-Mode Photonic Crystal Fiber", Optics Letters, Jul. 1, 1997, pp. 961-963, vol. 22, No. 13, Optical Society of America (cited in specification).

* cited by examiner

*Primary Examiner*—Sung Pak
(74) *Attorney, Agent, or Firm*—Buchanan Ingersoll & Rooney PC (57) ABSTRACT

A photonic optical fiber and method of making the optical fiber. The method includes assembling a plurality of elongate elements to define an elongate void; forming within the void a material contacting at least some of the elements while maintaining the elongate void; and drawing a preform, including the assembly of elongate elements, into an optical fiber.

21 Claims, 5 Drawing Sheets

OPTICAL FIBER AND METHOD FOR MAKING AN OPTICAL FIBER

FIELD OF THE INVENTION

The present invention relates to an optical fiber and methods of making optical fibers and particularly, but not exclusively, to photonic crystal fibers and methods of making photonic crystal fibers or the like in which the fibers have one or more elongate holes running along their lengths.

BACKGROUND OF THE APPLICATION

Photonic crystal fibers (PCF), or holey fibers as they are sometime referred to, are a relatively new class of optical fibers. Most commonly, these fibers have a core surrounded by a periodic array of elongate holes formed in a matrix material. The array acts to confine light to the core. Since the core, in effect, breaks the periodicity of the array of holes, it is often referred to as a core defect.

In one class of PCF, the core defect is solid and the holes are formed in a matrix material, which is typically made from the same material as the core. The combination of the holes and the matrix material in this kind of fiber acts to create an effective refractive index in the cladding region, which is lower than the refractive index of the core defect, and the fiber can guide light in the core defect by virtue of the effective refractive index step between the core and cladding; by analogy to standard optical fiber guidance. One category of this kind of fiber is described in "Endlessly single-mode photonic crystal fiber", Birks et al., Optics Letters 22 (961–963), 1997.

In another class of PCF, the core defect comprises a void and the holes in the cladding are arranged in a periodic array to create a photonic band-gap structure. The photonic band-gap prevents light over a range of predetermined wavelengths and propagation constants from passing through the structure. By this means, light having one of the predetermined wavelengths and propagation constants, which is coupled into the core defect, can be confined to and guided along the fiber in the core defect. One category of this kind of fiber is described in International Patent Application PCT/GB00/01249.

A number of different ways to manufacture PCF are known. Most commonly, a preform stack is assembled using individual elongate glass elements to match, in cross section and on a macro scale, the form of the desired PCF. The stack is then typically over-clad using a large diameter glass tube or capillary, which is large enough to cover the stack and small enough to keep the individual elements in their relative positions in the stack. The stack is then heated and drawn into a fiber, in one or more drawing stages, in a standard fiber drawing facility. One or more over-cladding layers of material may be added for strength and protection during the drawing stages.

A preform for a PCF having a solid core defect is typically relatively simple to assemble, since the cladding region can comprise a bundle of hollow capillaries and the core defect can comprise a solid rod, which has the same external dimensions as the hollow capillaries. The solid rod simply replaces a capillary in an inner region of the bundle.

In contrast, it can be more difficult to assemble a preform for a hollow core PCF, since the hollow core defect in a resulting fiber typically needs to have a cross sectional size that is significantly larger than any one cladding hole, in order for the core defect to be large enough to support at least one core-guided mode.

In the aforementioned patent application PCT/GB00/01249, a pre-form suitable for making a hollow core PCF was formed by omitting from a stack of round cross section silica capillaries, arranged in a close-packet triangular array, an inner capillary and, in addition, the six capillaries surrounding the inner capillary. The resulting fiber may, therefore, be referred to as having a seven-cell core defect. The capillaries around the core defect boundary in the stack were supported during formation of the pre-form by inserting truncated capillaries, which did not meet in the middle of the stack, at both ends of the capillary stack. The stack was then heated in order to fuse the capillaries together into a pre-form suitable for drawing into an optical fiber.

An alternative method for making a PCF is described in U.S. Pat. No. 6,444,133. This patent describes a preform stack comprising hexagonal capillaries having circular bores, from which an inner capillary is omitted to leave a hexagonal void. U.S. Pat. No. 6,444,133 proposes that, by etching the entire pre-form, the flat surfaces of the hexagonal void dissolve away more quickly than the curved surfaces of the exposed capillary bores. The effect of etching is that the walls of the capillaries next to the hexagonal void fully dissolve, while the remaining capillaries simply experience an increase in hole-diameter. Overall, the resulting pre-form has an increased fraction of air in the cladding structure and a core defect that is closer in size to a seven-cell core defect than to a single cell core defect.

United States Patent Application No. 2004/0050110 describes different methods for making PCF preforms. In one embodiment, a method involves providing so-called sacrificial rods, corresponding to the desired locations of holes in a desired preform, depositing soot around the rods, consolidating the soot to form a solid, structured body, removing the rods, thereby leaving holes in the preform and, finally, drawing the preform into a PCF. The present inventors believe that it would take a significant amount of time to deposit an amount of soot necessary to form a preform in the manner described.

In applicant's co-pending, published patent application WO03/080524, a method of making a PCF is described which involves drawing PCF from a preform while pressurizing different holes in the preform at different pressures. The method is suitable for drawing fibers in which the hole sizes in the preform are different or where it is desired to vary the hole size relationships in a PCF compared with the same hole size relationships in the respective preform.

In general, it has been found desirable to pressurize holes in the preform during the fiber drawing process in order to counteract the effects of surface tension in the glass (or other material) used to make the PCF, which tends to collapse the holes. It follows that it is desirable to maintain a lower pressure in larger holes in a preform than in the smaller holes, since surface tension causes smaller holes to collapse more easily than larger holes. Hence, in making hollow core PCF in particular, it is desirable to maintain during fiber drawing a pressure differential between the smaller cladding holes and a larger core hole; with the core hole being under the lower relative pressure.

One way to facilitate differential pressurization is to assemble the stack and heat and fuse the elements of the stack together before the fiber drawing step. Then, the core region is isolated from the cladding region and the stack can be differentially pressurized during the drawing step. It has, however, been found difficult to heat the stack to a temperature sufficient to fuse the capillaries without the capillaries deforming or even collapsing.

Another way to facilitate such differential pressurization is to use a large diameter capillary or tube in the core region of a preform. This method has the advantage that the large diameter capillary acts both as a natural support member, to support the cladding capillaries around the core defect region, and as the means for isolating the core region from the cladding holes. While this method finds useful application in PCF manufacture, it naturally adds material to the periphery of the core defect region, which would otherwise comprise material only from the cladding capillaries. The present inventors have found that a thicker core boundary can lead to deleterious effects, such as becoming a means for supporting unwanted surface modes, which are guided on or near to the surfaces of the core boundary. These surface modes can become loss paths, due to undesirable coupling of power from core-guided modes to the surface modes.

Figures 1, 2, 3:
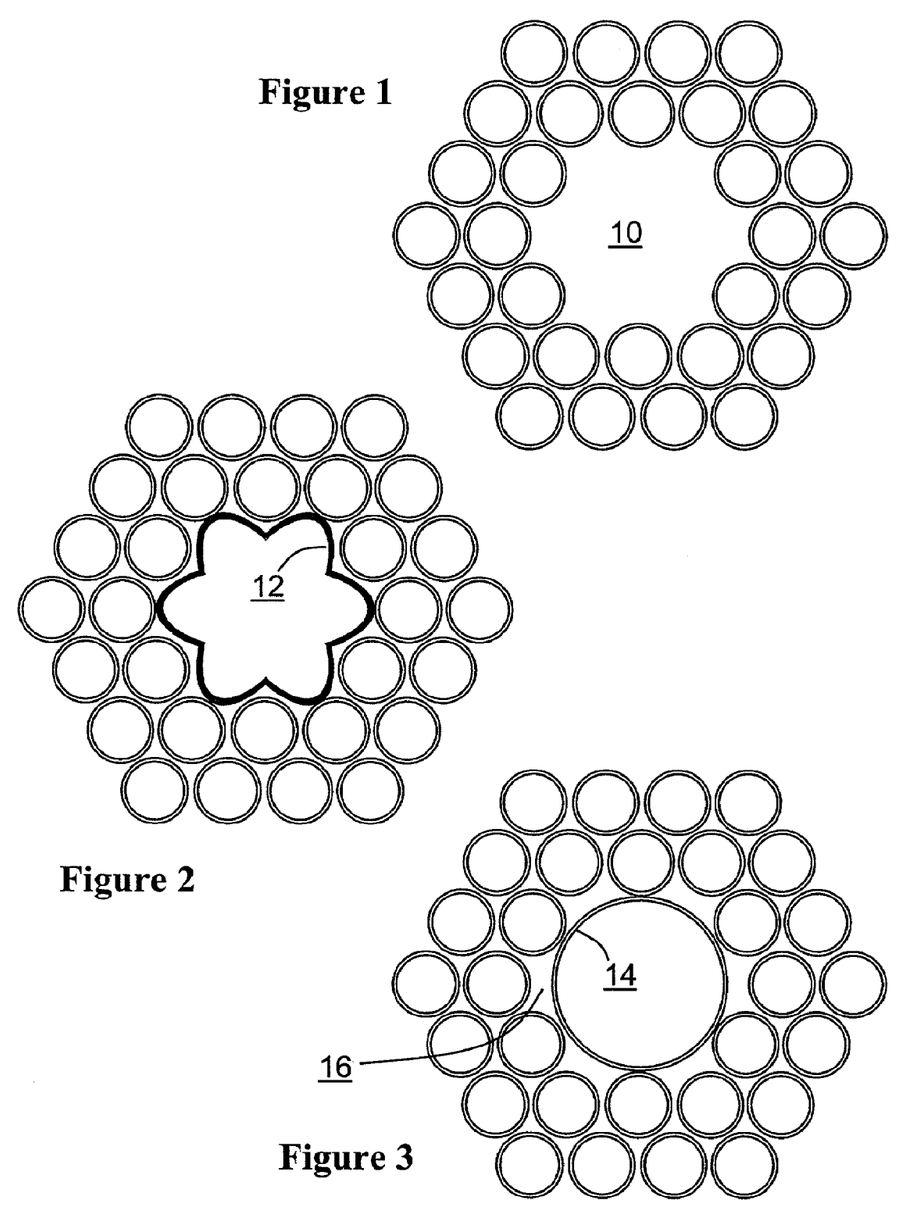
FIG. 1 is a schematic diagram of a transverse cross section of an inner region of a PCF preform illustrating the generally hexagonal nature of a seven-cell core defect.
FIG. 2 is a schematic diagram of the PCF preform of FIG. 1 with the addition of an inner capillary profiled to substantially match the profile of cladding capillaries around the core defect.
FIG. 3 is a schematic diagram of the same PCF preform of FIG. 1 with the addition of a large diameter, circular capillary in the core defect.

An additional problem with using a large diameter capillary in a core region is that it can be difficult to match the outer cross sectional shape of the capillary, at the dimensions required in a stack, with the cross sectional shape of the void left by omitting one or more capillaries. For example, if seven round capillaries are removed, as in WO03/080524 referred to above, the core void 10 has a generally hexagonal cross sectional shape, as shown in the schematic diagram in FIG. 1. A large diameter capillary 12 can be formed to match the cross section of the void, as shown in FIG. 2. Alternatively, a round, large diameter capillary 14 may be used, as shown in FIG. 3.

In the former case, accurately forming a capillary 12 with a cross section that is not round can be difficult, particularly if the capillary needs to be drawn down to a different scale after initial formation. In the latter case, unwanted interstitial voids 16 form between the large diameter capillary and the cladding capillaries. While the unwanted voids can be removed by evacuating them during a fiber drawing step, such evacuation can result in undesirable core boundary deformation, caused by portions of the large diameter capillary and portions of the cladding capillaries, around the unwanted interstitial voids, deforming towards one another as the voids close. In this event, a resulting PCF structure may acquire different sizes and shapes of hole around the core defect, which can disrupt the band-gap, for example by reducing its bandwidth of operation.

OBJECTS AND SUMMARY

An object of the present invention is to provide an alternative method of making an optical fiber, such as a PCF, which is intended to mitigate one or more of the shortcomings of the prior art methods.

According to a first aspect, a method of making an optical fiber comprises the steps of assembling a plurality of elongate elements to define an elongate void; forming within the void a material contacting at least some of the elements while maintaining the elongate void; and drawing a preform, including the assembly of elongate elements, into an optical fiber.

The method may include forming within the void a material contacting substantially all of the elements.

The material may form in crevices or gaps between adjacent elements. Some or all of the elements may be close-packed and abutting or, alternatively, slightly spaced apart. If spaced apart, the material may bridge the gaps between elements, thereby filling the gaps entirely.

The method may include forming within the void a layer of material that substantially lines the elongate void.

In any case, the material may substantially seal the void from other regions of the preform. Of course, "seal" as used herein does not imply the need for a perfect fluid seal. For example, a seal may only need to be sufficiently good that a gas pressure differential can be substantially maintained between the void and other regions of the preform during the drawing step. In other words, a certain degree of fluid leakage while maintaining the pressure differential may be tolerable.

Indeed, the method may include the step of maintaining a pressure differential between the elongate void and other regions of the preform. The pressure differential may be maintained during at least a part of the drawing step, or throughout the drawing step. For example, different pressures may be applied to different sizes of void during fiber drawing in order to balance the effects of surface tension on the respective holes. In addition, or alternatively, the pressure differential may be maintained during the step of forming the material, before the drawing step. For example, the void may be maintained at an over-pressure, so that there is a flow of, for example, gas through any gaps along the sides of the void, which acts to cause the material to enter and fill the gaps or crevices between elements. Alternatively, the void may be maintained at an under-pressure, in order to prevent the material from escaping through gaps along the sides of the void and entering other regions of the preform.

In some embodiments, the material is formed in situ from a vapour or liquid phase. By "in situ", we mean that the material forms in the void rather than being introduced into the void as a pre-formed solid (or non-contiguous solid). Typically, the respective vapour or liquid phase reactants are carried into the void in a flow of carrier gas or carrier liquid.

The step of forming the material may comprise using a chemical vapour deposition (CVD) process, for example a thermal chemical vapour reaction. The CVD process may be a modified chemical vapour deposition (MCVD) process or a plasma modified chemical vapour deposition (PMCVD) process. These known processes involve first forming in situ a non-contiguous solid, for example silica soot, and then sintering the soot to form the material. Alternatively, the CVD process may involve plasma chemical vapour deposition (PCVD). In this case, it is known that the material forms directly from the thermal chemical vapour reaction, without formation of a soot as such.

Alternatively, the step of forming the material may comprise using liquid phase deposition. For example, the step may comprise providing a sol, such as a colloid suspension of silica particles, allowing the sol to gel and firing the gel to form the material in a known manner. As a further alternative, the method may comprise providing liquid material, for example a liquid polymer, and setting the material, for example by permitting the material to cool (if it was liquid due to heating) or curing the material with a UV lamp (if the material is a UV-curable polymer).

An advantage of using a CVD or sol gel process is that the material is typically in an extremely pure form, which is uncontaminated by processing that typically occurs in commercial scale glass manufacture and preparation.

In some embodiments, other elongate elements are arranged around the first-mentioned elongate elements. For example, the first mentioned elongate elements may be those that form a first layer of holes around a core defect void. In many kinds of PCF, there are typically plural layers of holes around a core defect void and the other elongate elements may form those holes.

The elongate void may be part of a core region or part of a cladding region of the fiber. In one embodiment, the elongate void is a hollow core defect in a fiber. For example, the fiber may guide light in a hollow core defect by virtue of a cladding arranged to provide a photonic band-gap. Then, a pressure differential may, for example, exist between the core defect void and the cladding voids during fiber drawing. Alternatively, or in addition, the pressure differential may be between a core void and interstitial voids. Indeed, the pressure differential may exist between any two or more voids in the preform and need not necessarily involve a core void. For example, the core may be solid and the pressure differential may exist between two voids in the cladding.

An advantage of embodiments of the present invention is that the amount of material used in sealing the crevices or gaps can be sensitively controlled. For example, the amount of material formed may be the minimum necessary to form a satisfactory seal. For example, if the elements are tightly packed substantially along the entire length of the preform, only a relatively small amount of material would be required to seal the crevices or gaps. In contrast, a relatively thick layer, or complete lining, of material may be formed, which completely covers all the areas of the elements that bound the void. The applicant has demonstrated that a core boundary above a certain thickness may induce a beneficial anti-resonance effect, which can reduce the number and/or impact of surface modes that may be guided by the respective fiber. Another advantage of embodiments of the present invention is that the material may act to bind the elements together, to add additional mechanical rigidity and support to the preform stack during the drawing step. Further, the material typically forms in accord with the contours of the elements around the void, thereby minimizing the degree of deformation that may otherwise occur.

The material may have substantially the same composition as the elongate elements, or a different composition. For example, either the elongate elements or the material may be doped and the other(s) may be pure. Alternatively, both may be differently doped. The material may be doped to provide certain optical characteristics, for example a specified refractive index, which may be higher or lower than the refractive index of the elements. Alternatively, or in addition, the material may be doped to modify a physical characteristic, for example, softening point, of the material. In some embodiments, the material may be doped to provide it with a lower softening point, in order that the material softens before the elements during fiber drawing. In this way, the material may act like a flux in order to seal the void.

Alternatively, the materials may be a different material than the elements. For example, the material may be a different glass, a different polymer or a mixture of organic and inorganic materials. The present invention is not limited to any particular class of materials or material combinations as long as a desired fiber can be made.

BRIEF DESCRIPTION OF THE DRAWINGS

Embodiments of the present invention will now be described by way of example only with reference to the accompanying drawings, of which.

DETAILED DESCRIPTION OF THE PREFERRED EMBODIMENTS

Figure 4:
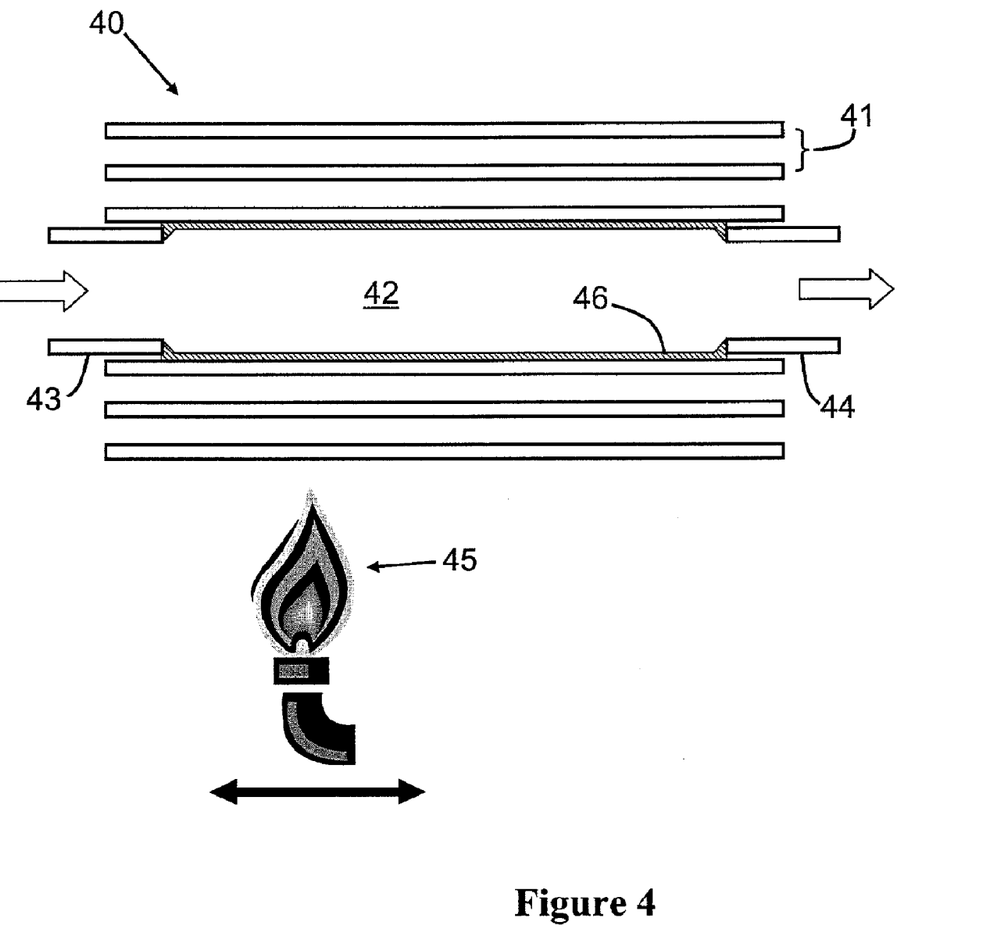
FIG. 4 is a schematic diagram of a longitudinal cross section of a preform arranged for depositing silica soot inside a core defect region of the preform.

FIG. 4 illustrates an inner region of a preform stack 40 in longitudinal cross section. The preform stack 40 comprises a plurality of round cross section silica capillaries 41 stacked in a hexagonal close packed arrangement of the kind illustrated in FIG. 1. The capillaries 41—only two layers of which are shown arranged around a core defect region 42—are supported around the core defect at each end of the stack by a short length of large diameter glass capillary tube, 43 and 44. The glass capillary tubes 43, 44 act to support the capillaries 41 around the core defect region 42 and also act as an inlet and an outlet for connection to an MCVD gas supply (not shown). The entire stack is inserted into an over cladding tube (not shown), which is large enough to receive the stack as a sliding fit and small enough that the entire arrangement can be rotated about its longitudinal axis without the capillaries becoming dislocated. Next, the entire over clad stack is mounted on an MCVD lathe (not shown). Even though the capillaries in the stack are held in place relatively firmly by the over cladding tube, the joins, where capillaries abut along their lengths, are unlikely to be gas tight.

A mixture of oxygen and silicon tetrachloride is then passed into the stack 40 through the inlet tube 43, through the core defect region 42 of the stack 40 and out of the outlet tube 44. The gas mixture may be prevented from entering the capillaries and interstitial voids by sealing them, for example by heating and collapsing the ends of the over cladding tube and capillaries, or by providing a manifold that only permits the gas to enter the core defect region of the stack. Other ways of preventing the gas entering the capillaries and interstitial voids will be apparent to the skilled person.

Figure 5:
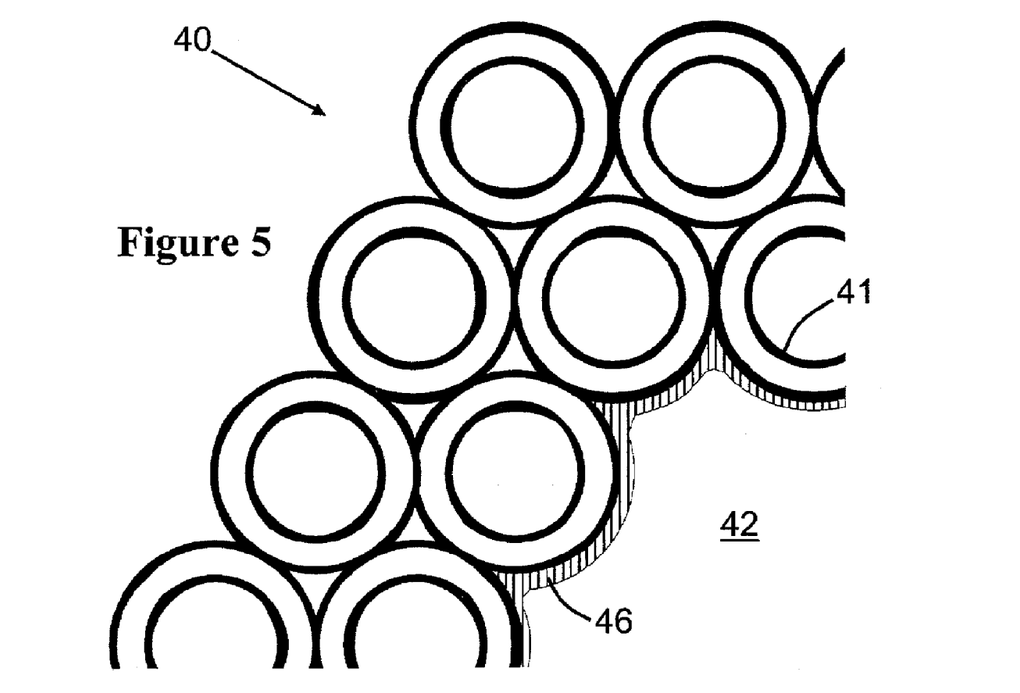
FIG. 5 is a schematic diagram of an exploded view of one part of a transverse cross section of an inner region of the preform of FIG. 4, showing deposited soot on the inside of the core defect wall.

The gas flow rate is brought to a steady state and, then, while the lathe rotates the stack, an oxyhydrogen torch 45 is arranged to reciprocate along the stack 40 and heat the stack to a point where the glass begins to soften, but not to the point where the stack deforms. The gas reacts in the extreme heat inside the core defect region 42 and tiny particles of silica, called soot, are formed and settle at the bottom of the core defect region, where they adhere to the softened stack. Given sufficient time, which will depend on the concentration of the silicon tetrachloride in the oxygen and the heating temperature, the soot forms a significant porous layer 46 that entirely covers the inside of the core defect region of the stack as it rotates, as illustrated in the schematic diagram in FIG. 5, which shows an exploded view of a small portion of the transverse cross section of the stack of FIG. 4.

As a next step, the layer of soot 46 is sintered into a layer of glass 46' by continuing to heat the stack 40 with the flame 45. Alternatively, the entire stack can be removed from the lathe and baked in an oven to sinter the soot.

The effectively massive surface area of the soot particles permits the soot to consolidate at a temperature significantly below the temperature at which the stack 40 melts and deforms. The porous layer of soot consolidates into a fine layer of silica, which is relatively thin compared with the layer of soot. In fact, the layer of silica can be so thin that it does not appreciably increase the thickness of the cladding capillaries 41. However, the layer of silica 46' is thick enough to fill and seal the joins 47 between abutting cladding capillaries 41, as illustrated in the diagram in FIG. 6.

Figure 6:
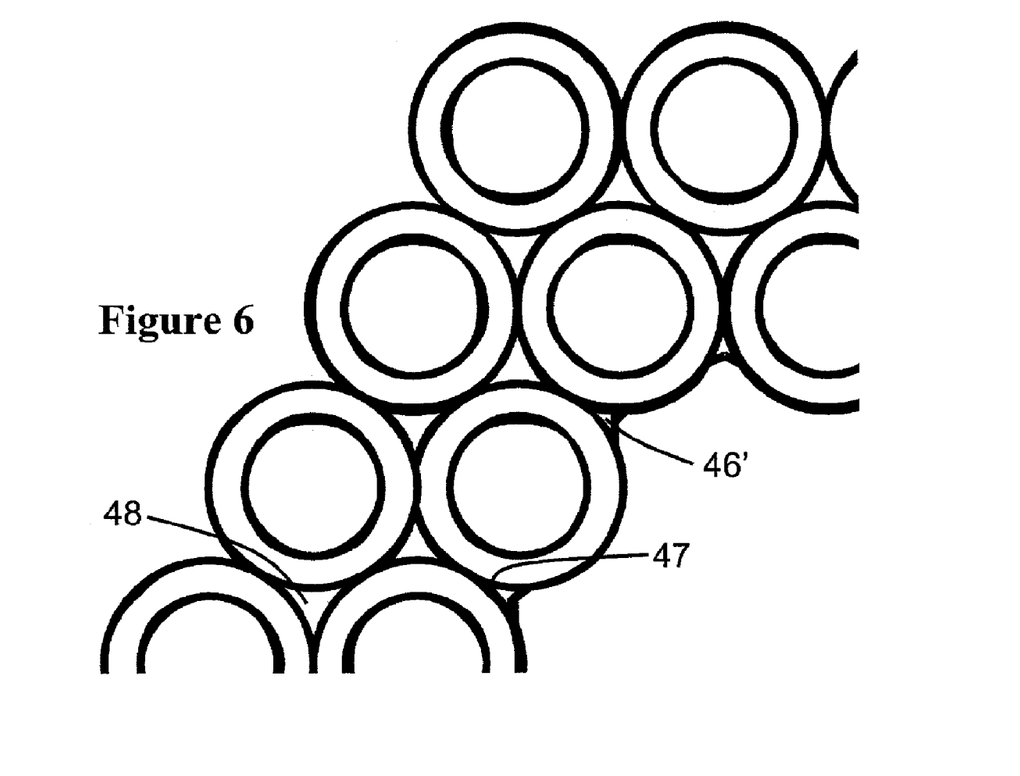
FIG. 6 is a schematic diagram of the same preform as shown in FIG. 5, this time with the soot having been consolidated.

Once the joins 47 are sealed, the core defect 42 of the stack is substantially isolated from other regions of the stack and the core defect may be pressurized during the fiber drawing step independently of the other regions of the stack. For example, the core defect region may be pressurized to a lower pressure than the holes in the cladding capillaries, and the interstitial voids 48 between the cladding capillaries may be substantially evacuated in order that they collapse during fiber drawing.

Clearly, the thickness of the soot layer in the core defect can be sensitively controlled by varying the heating temperature, the concentration of the silicon tetrachloride in the oxygen and the deposition time. The thickness of the consolidated layer of silica is a direct function of the amount of deposited soot. The skilled person is free to chose whether to form an extremely fine layer of silica, for example just sufficient to seal the joins between abutting capillaries, or a relatively thick layer of silica, which would cause the core defect boundary of the resulting fiber to be relatively thick, for example compared with the thickness of cladding regions formed only by two abutting capillaries. The choice depends on the required fiber design and respective characteristics.

Figure 7:
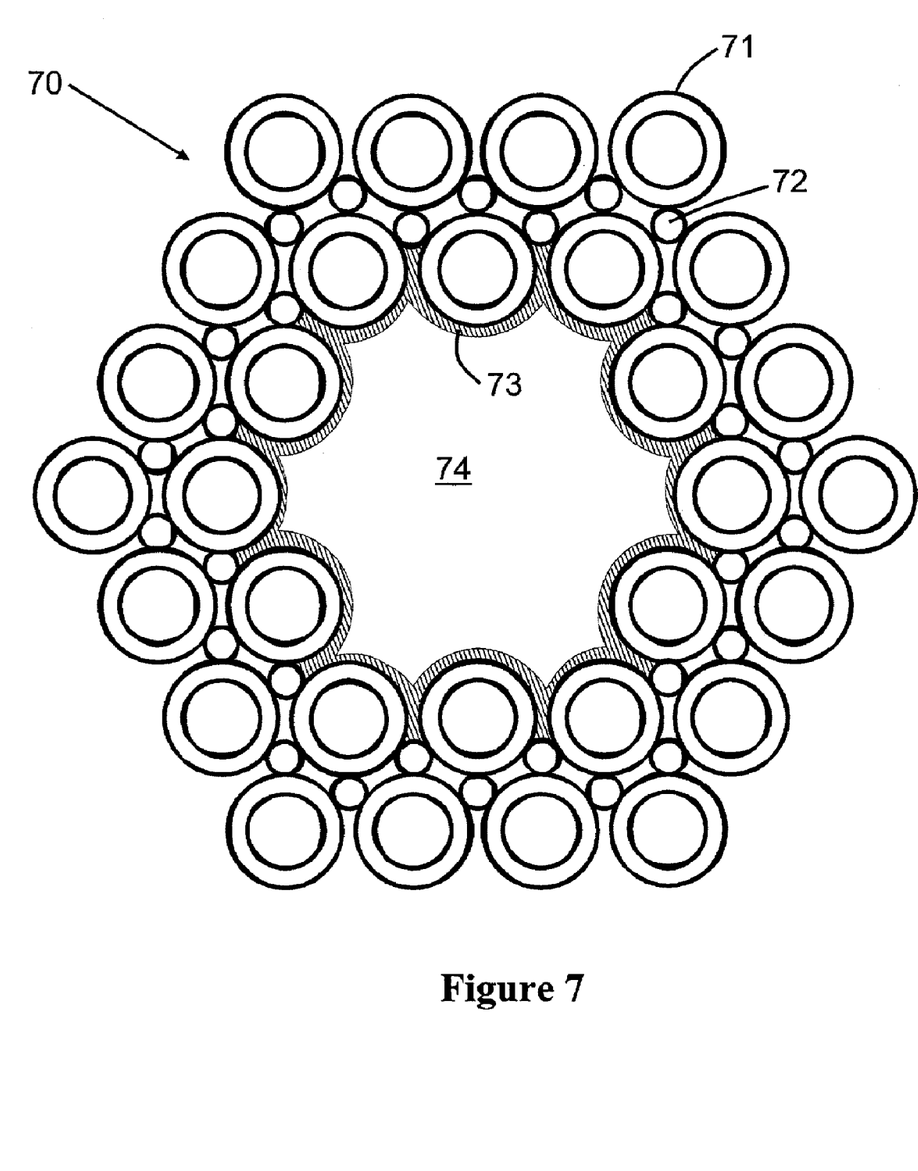
FIG. 7 is a schematic diagram of an alternative preform prepared according to an embodiment of the present invention.

FIG. 7 is a schematic diagram of an inner region of an alternative preform stack 70. In this case, the cladding is formed from relatively large diameter capillaries 71 and relatively small diameter rods 72; the rods being large enough to keep the capillaries slightly spaced apart. The stack 70 is shown having a layer of deposited soot 73 around the periphery of a core defect 74, where the periphery is defined both by capillaries and rods in this example. When consolidated, the soot forms a glass layer that is sufficient to seal the points where capillaries and rods meet around the core defect region.

Figure 8:
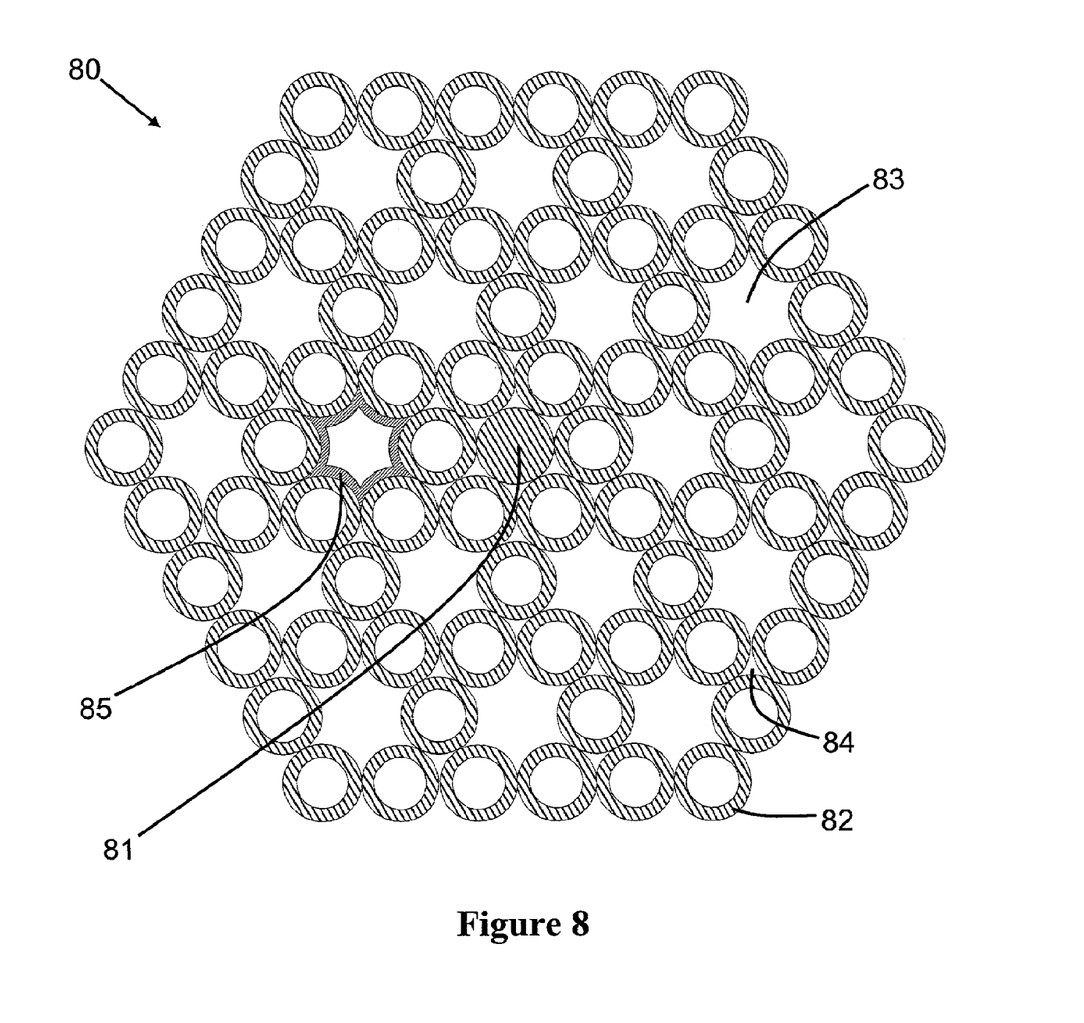
FIG. 8 is a schematic diagram of an alternative preform prepared according to an embodiment of the present invention.

FIG. 8 is a schematic diagram of an alternative preform stack 80, which has a solid rod 81 in the core defect region. The resulting fiber, therefore, has a solid core defect. The cladding region in the stack comprises an arrangement of capillaries 82 that form both relatively large holes 83 and interstitial holes 84. During the drawing process, the interstitial holes 84 are evacuated, so that they collapse, and the capillaries 82 and relatively large holes are pressurized to prevent collapse. As shown, one relatively large hole has a layer 85 of silica soot deposited on its inner surface. In practice, more than one, or even all, of the relatively large holes may have a similar layer of soot. The method described with reference to FIGS. 4, 5 and 6 can readily be adapted for flowing gas into one or more cladding holes rather than a core defect hole. Once the soot in the relatively large hole is sintered, that hole is isolated from the interstitial holes and may be pressurized at a different pressure than the interstitial hole.

The gas flowed through the stack during heating may include other constituents, for example constituents that form germanium or phosphorus. In this way, the refractive index of the resulting consolidated glass can be raised or lowered and the melting point can also be modified from that of pure silica. Indeed, in some embodiments, a different glass entirely could be deposited on the inner surface of the core defect. For example, the different glass (or other material) could be one which has an intrinsically lower surface roughness than silica, thereby potentially reducing the potential loss of a resulting fiber due to scattering and mode coupling.

An alternative way of depositing a material, for example silica, on the inner walls of the core defect of a stack is to use a sol-gel. In one embodiment, the sol is poured through the core defect of the preform stack, leaving a thin coating over the entire inner wall of the core defect. The sol layer is then heated, by heating the entire stack, to drive off the sol binder and, with additional heating, the gel is sintered into a solid silica coating. Such a process may be adapted to deposit the sol only at certain points in a stack, for example only along joins between capillaries. In this way, use of a sol-gel process may provide a finer control over the amount of material deposited than a soot process.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

What is claimed is:

1. A method of making an optical fiber, the method comprising: assembling a plurality of elongate elements to define an elongate void; using a deposition technique to form within the void a material contacting at least some of the elements while maintaining the elongate void; and drawing a preform, including the assembly of elongate elements, into an optical fiber, wherein the deposition technique is selected from the group consisting of:

forming the material in situ from a vapour or liquid phase;

forming the material with a chemical vapour deposition process;

forming the material with a thermal chemical vapour reaction;

forming the material by forming a soot and sintering the soot;

forming the material with a liquid phase deposition;

forming the material by providing a sol, allowing the sol to gel, and firing the gel; and forming the material by providing a liquid material and setting the material.

2. The method according to claim 1, wherein the material contacts substantially all of the elements.

3. The method according to claim 1, wherein the material forms in crevices or gaps between adjacent elements.

4. The method according to claim 2, wherein the material forms in crevices or gaps between adjacent elements.

5. The method according to claim 1, wherein the material forms a layer that substantially lines the elongate void.

6. The method according to claim 1, wherein the material substantially seals the void from other regions of the preform.

7. The method according to claim 1, further including the step of maintaining a pressure differential between the elongate void and other regions of the preform.

8. The method according to claim 7, wherein the pressure differential is maintained during at least a part of the drawing step.

9. The method according to claim 1, wherein the material is formed in situ from a vapour or liquid phase.

10. The method according to claim 1, wherein the step of forming the material comprises a chemical vapour deposition process.

11. The method according to claim 1, wherein the material is formed by a thermal chemical vapour reaction.

12. The method according to claim 1, wherein the step of forming the material comprises forming a soot and sintering the soot to form the material.

13. The method according to claim 12, wherein the soot comprises silica particles.

14. The method according to claim 11, wherein the reaction does not involve the formation of a soot.

15. The method according to any claim 1, wherein the step of forming the material comprises a liquid phase deposition.

16. The method according to claim 1, wherein the step of forming the material comprises providing a sol, allowing the sol to gel and firing the gel to form the material.

17. The method according to claim 16, wherein the sol comprises a suspension of silica particles.

18. The method according to claim 1, wherein the step of forming the material comprises providing a liquid material and setting the material.

19. The method according to claim 1, wherein other elongate elements are arranged around the first-mentioned elongate elements.

20. The method according to claim 1, wherein the elongate void is part of a core region of the fiber.

21. The method according to claim 1, wherein the fiber is arranged to guide light in a hollow core defect by virtue of a photonic band-gap.

* * * * *